Oct. 28, 1969  C. H. MALPAS  3,474,933
BULK CONTAINERS FOR LIQUIDS
Filed Nov. 17, 1966  2 Sheets-Sheet 1

INVENTOR
CHARLES HENRY MALPAS
by
McCarthy, Depaoli & O'Brien
ATTORNEYS

Oct. 28, 1969

C. H. MALPAS 3,474,933

BULK CONTAINERS FOR LIQUIDS

Filed Nov. 17, 1966

INVENTOR,
CHARLES HENRY MALPAS
by
McCarthy, Depaoli & O'Brien
ATTORNEYS

United States Patent Office 3,474,933
Patented Oct. 28, 1969

3,474,933
BULK CONTAINERS FOR LIQUIDS
Charles Henry Malpas, 11 Layton Crescent,
Geelong, Victoria, Australia
Filed Nov. 17, 1966, Ser. No. 595,253
Claims priority, application Australia, Nov. 19, 1965,
66,775/65; Nov. 29, 1965, 67,166/65
Int. Cl. B67b 87/24, 81/24
U.S. Cl. 222—90      10 Claims

ABSTRACT OF THE DISCLOSURE

A bulk container for liquids which become contaminated or otherwise deteriorate when exposed to air, comprising a container having fitted to it a socket member for receiving a tap for dispensing the contents of the container in such manner that the tap will engage therein in substantially leak-free manner, a collapsible bag connected to a wall of the container and air vent means arranged to permit the flow of air into the collapsible bag as liquid is discharged from the container, the collapsible bag being adapted to restrict contact of air with the contents of the container.

---

This invention relates to bulk containers and relates particularly, but not exclusively, to containers for liquids such as unfortified wines which deteriorate, or because otherwise contaminated, when exposed to air. Bulk containers made according to the invention are also useful for the storage and transport of milk and other liquids.

It has been proposed to provide a container having in it a flexible bag or lining of a material such as polyethylene, for holding the liquid to be stored in the container, and means at or near the base of the container for tapping the container and flexible lining so that liquid in the flexible bag or lining may be withdrawn from the container. Also, the container has a vent—usually at or near its upper end—so that when liquid is withdrawn from within the flexible lining air will flow into the container, outside the flexible lining, to cause that lining to collapse around the liquid remaining in it. In this form of container the air thus admitted to the container does not come into direct contact with the liquid within the flexible bag or lining, so that a liquid subject to deterioration—such as an unfortified wine—may be stored for an appreciable period of time.

There are several disadvantages with the construction as hitherto proposed in that the tap used must engage through the flexible lining in such manner as to make a liquid-tight seal therewith, as otherwise liquid will seep into the space between the inner wall of the outer container and the outer wall of the flexible bag or lining, in that the filling and sealing of the flexible bag or lining can present problems, and in that the flexible bag or lining must be specially made to fit neatly into the container. Also, the tap must be made so that it will puncture the lining material and project into the flexible bag without any substantial leakage of liquid from the bag—it being realised that the outer container may be made of a cardboard which will soften and weaken if subjected to moisture.

This invention has been devised with the object of providing means for overcoming these disadvantages and, by so doing, providing a liquid container of such construction that when a quantity of the liquid is withdrawn from the container air will not be permitted to make direct contact with the liquid still remaining in the container, and wherein there will be no real likelihood of leakage of liquid, wherein problems associated with the filling and sealing of the flexible bag will be eliminated, and wherein a standard or substantially standard form of bag may be used in the container.

Another object is to provide an improved container for perishable liquids. A further object is to provide a bulk container for the transport and storage of perishable liquids—such as milk and unfortified wines—from which the liquid contents may be dispensed as required, and in which the liquid contents will remain in good condition for a relatively long period.

Further objects of the invention will be apparent from the description set out herein.

This invention provides a bulk container for liquids having a collapsible flexible bag connected to a wall of the container, there being air vent means arranged to permit the flow of air into the bag when liquid is being discharged from the container—that is to say, to permit air to flow into the bag to take up the space in the container previously occupied by the liquid discharged—the bag restricting the air from coming into contact with the liquid.

The container may be a can having opposite end walls and a cylindrical or barrel-shaped side wall, or of any other suitable shape. The walls of the container may be internally coated with a material to prevent deterioration of the liquid in contact with the walls.

The bag may be of a material impervious to air (such as polypropylene) and/or a material not subject to attack by the liquid in the container. Alternatively there may be a bag made of air-impervious material within a second bag made of a material not subject to attack by the liquid.

Thus, for unfortified wines it may be preferred to use polypropylene coated with saran, or a high or a low density polyethylene which also may be coated with saran. For fortified wines a low density polyethylene would probably be adequate for the purpose.

The container may be made of metal—as tinplate—or of other material suitable for the storage of the liquid, and if there is a likelihood of the liquid contents being contaminated by contact with the walls of the container, or of those walls being subject to attack by the liquid, then the interior surface of the container should be treated—as by spraying with a suitable lacquer—to prevent such contamination and/or attack.

The container may be prepared for use with milk or any one of a wide variety of other liquids.

Preferably the air vent means consists of a plug member engaged with the flexible bag and fitted into an opening in a wall of the container said plug member having in it a passageway to permit flow of air into said bag. Said passageway may be sealed initially against the flow of air—to protect the air bag against damage from foreign matter—and the plug constructed so that the seal may be readily broken.

It is also preferred to provide in a wall of the container—usually a second wall and not that having the air bag connected to it—a socket member for the reception of a tap by means of which the liquid contents may be drawn off, the socket member being initially sealed against leakage of liquid by a frangible diaphragm. The socket member is preferably nonrotatable in said wall and also has means for holding the tap against rotation.

In order that the invention may be clearly understood and readily put into practical form reference will now be made to the accompanying illustrative drawings, wherein.

Figure 1:
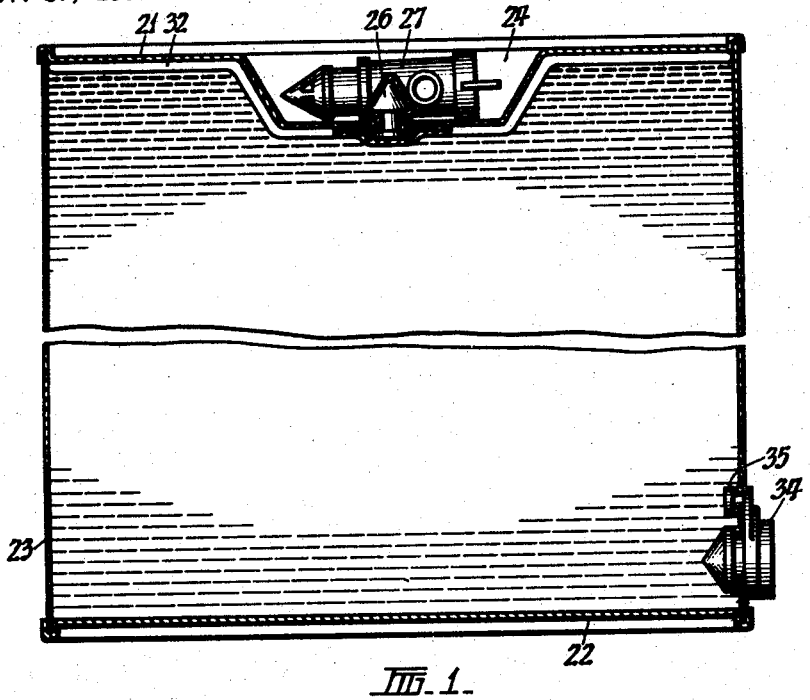
FIG. 1 is a vertical cross-section through a container having fitted therein an air bag and a sealed socket fitting for the reception of a tap, the container being shown as filled with liquid.

Reference is made initially to FIGS. 1, 2, 4, 5, 8, 9 and 13.

The container has opposite end walls 21, 22 and a side wall or walls 23. The wall 21 is recessed at 24 and in that recess is a flanged opening—that is to say, the edge of the metal around the opening is formed as a flange 25, the recess 24 in the end of the container accommodates the outer portion of a plug 26 and a tap 27 placed therein for convenience in packaging.

The plug 26 has a flange 28 at its inner end and a tapered nose part 29 at its outer end, a neck portion 30 of reduced diameter between those parts and a passageway 31 extending the major part of the way through the plug from the inner end thereof.

The plug 26 is accommodated in a sealed collapsed air bag 32 so that when the nose part 29 of said plug is forced through the flanged opening in the end wall 21 it will draw part of the material of the air bag 32 with it and thereby fasten the air bag 32 to the end wall 21. The neck 30 of the plug is of such diameter and length that when the plug is engaged in the flanged opening the neck of the plug, surrounded by a layer of the material of the bag 32, will be an air-tight fit in said flanged hole and the outer edge of the flange 25 will grip the material of the bag 32 against the shoulder at the inner end of the nose part 29.

The air bag 32 is made a size such that it can fit within the container so as to completely (or substantially completely) fill the container. Initially the bag as fitted to the end wall 21 is collapsed so that there is very little air in it and it is sealed so as to be substantially air-tight. Thus, when the air bag 32 is first fastened to the end wall 21 of the container and said container is filled with liquid it will tend to lie against said wall.

The side wall 23 has in it, at a position near the end wall 22, a flanged opening to accommodate a neck part 33 of a socket member 34 and a smaller flanged opening to receive a locating plug part 35 of said socket member 34. That socket member has a diaphragm 36 at the inner end, and outwardly of the diaphragm 36, a chamber 37 which is enlarged or recessed at the outer end to form a seating 38 for a flange on the tap 27. The chamber 37 is adapted to accommodate tightly the inner end part of that tap 27 and also to accommodate tightly a plug 39, which is provided to reduce likelihood of inadvertent damage to the diaphragm 36.

The socket member 34 is fitted to the side wall 23 so that the neck part 33 engages in the larger flanged opening and the locating plug part 35 engages in the smaller flanged opening. The flanged openings and the parts 33, 35 of the socket member 34 are so made that the socket member 34 is engaged with the side wall 23 in liquid-tight fashion—that is to say, in such fashion that in normal usage of the container liquid will not leak away past the external surface of the socket member 34.

The tap 27 has a barrel or body part 40 with a substantially cylindrical chamber in it and an outlet nozzle 41 extending therefrom, a shaped external flange 42 at the inner end of the body part 40, neck part 43 of reduced diameter as an inward longitudinal continuation of the body part and a pointed nose or probe 44 at the inner end of the neck 43. That nose is of substantially conical shape. There are several openings 45 through the probe leading to the interior of the tap, and said openings extend in the longitudinal direction of the tap. Fitted rotatably to the outer end portion of the tap is a spigot or turn-cock 46 having a hollow cylindrical part 47 closed at its outer end, an opening 48 through the wall of that cylindrical part 47 at a location to register with the outlet nozzle 41 when the turn-cock 46 is moved to the "ON" position, a cap part 49 fitting about the outer end of the barrel 40 and a finger piece 50. At the inner end of the part 47 is a small external enlargement 51 which engages in a recess in the wall of the barrel 40 to hold the turn-cock 46 against linear movement. These parts are so made that when the spigot 46 is turned to the "ON" position liquid can flow through the openings 45, through the neck part 43 into the hollow turn-cock 46 and out through the opening 48 and the outlet nozzle 41.

The flange 42 is made substantially the same shape as the seating 38 in the outer surface of the socket member 34, and of such a size as to engage neatly therein when the tap is fitted into the socket 34. Also, the inner end part of the neck part 43 is enlarged a small amount externally so as to form a bead adapted to hold the tap against linear movement in the socket member. Further, the outer end edge of the barrel 40 and the inner surface of the cap part 49 are made so that the turn-cock 46 has limited movement from the "ON" to the "OFF" position.

The container may be constructed by assembling the end wall 21 and the side wall 23, fitting the air bag 32 to the end wall 21 by pressing the nose part 29 of the plug 26 through the flanged opening in that end wall, fitting the socket member 34 into the flanged openings provided in the side wall 23, then—with the container inverted so that the end wall 21 is at the bottom—filling the container, placing the end wall 22 in position and sealing the container. The tap 27 may be conveniently fitted into the recess 24 and secured in position with adhesive tape.

When it is desired to use the contents of the container the tap 27 is removed from the recess 24, the sealing plug is removed from the socket 34 and the inner end part of the tap is pushed firmly into the socket chamber 37 so that the probe 44 will pierce the diaphragm and the neck part 43 of the tap is snugly seated in the socket 34 with the flange 42 engaged in the seating 38 (the turn-cock 46 being in the OFF position). When the tap has been correctly engaged in the socket 34 the top of the plug 26 is cut off so that the passageway 31 is open at its outer end, enabling air to flow into the air bag 32. If, then, the turn-cock 46 is moved to the ON position liquid from within the container will discharge through the outlet nozzle 41 and as it is so discharged air will enter the air bag 32 so as to replace the volume of liquid discharged, thereby preventing the formation of a "vacuum" such as would restrict the flow of liquid. Also, as the level of liquid drops and the upper portion of the container is filled with air (within the air bag) there is maintained a barrier—by reason of the air bag 32—between the air and the liquid remaining in the container so that there should not be any direct contact between such air and the liquid.

It is realized that in the filling of the container with liquid there may remain a small quantity of air in the container, but the volume of that air would be insufficient to cause any serious deterioration of the liquid contents.

Figure 2:
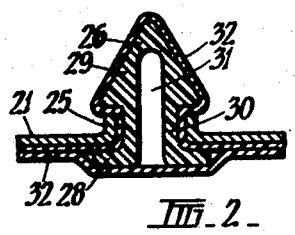
FIG. 2 shows in cross-section the plug fitting securing the air bag to one end wall of the container.
Figure 3:
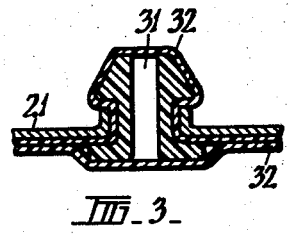
FIG. 3 is a similar view showing a modified construction of plug fitting.
Figure 4:
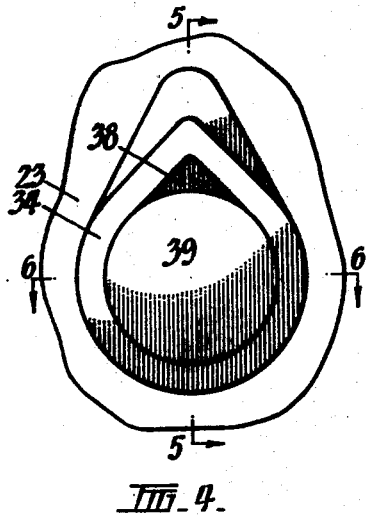
FIG. 4 is a view in elevation, from the outside of the container, showing the socket fitting for holding a tap.
Figure 5:
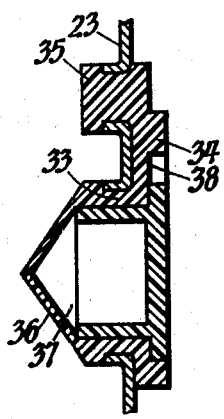
FIG. 5 shows a vertical cross-section on the line and in the direction of the arrows 5—5 of FIG. 4.

The modified plug shown in FIG. 3 differs from that illustrated in FIG. 2 in that the outer end of the nose part 29 is omitted and the sealing of the inside of the air bag 32 is effected by the thin film extending across the outer end of the passageway 31. Thus, for the air bag to operate it is necessary only to puncture the film stretched across the outer end of the passageway 31.

Figure 6:
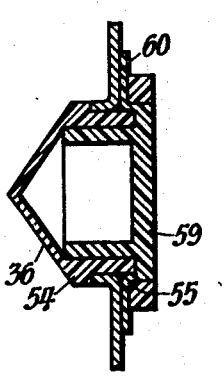
FIG. 6 is a horizontal cross-section showing a modified construction of socket fitting and a sealing plug associated therewith, the section being on the line and in the direction indicated by the line and arrows 6—6 of FIG. 4.
Figure 7:
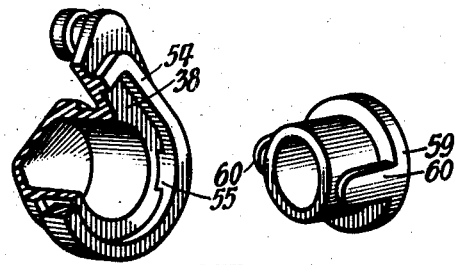
FIG. 7 is a broken-away perspective view showing the modified construction of socket fitting and its sealing plug.
Figure 8:
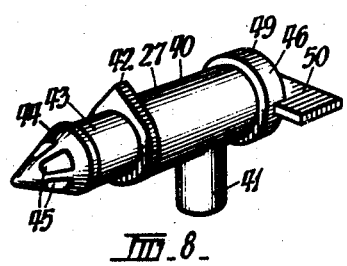
FIG. 8 shows the tap in perspective.
Figure 9:
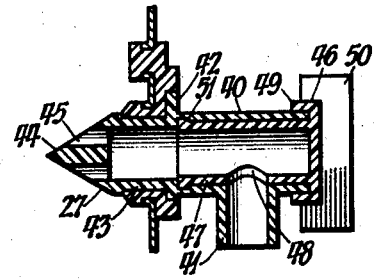
FIG. 9 illustrates, in vertical cross-section, the tap as fitted into its socket.

FIGS. 6 and 7 illustrate a construction of socket member and seating plug therefore which provides means for indicating if the contents of the container have been tampered with. The socket member 54 has narrow slits 55 on opposite sides of the seating 38 and the plug 59 has two thin arms 60 of such a size as to fit through the slots 55. The plug 59 is first fitted to the socket member 54 and when the socket member 54 is being fitted into the container the ends of the arms 60 will be spread outwardly across the external surface of the container so as to be visible—see FIG. 6. If the plug 59 is removed it will not be conveniently possible to force the arms 60 back through the slots 55 so as to extend outwardly of the socket member 54, and thereby it will be apparent that the plug 59 has been removed.

Figure 10:
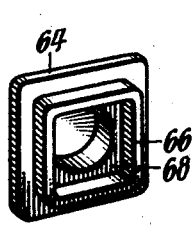
FIGS. 10 and 11 are, respectively, a perspective view of, and a cross-section through, a modified construction of socket fitting.
Figure 11:
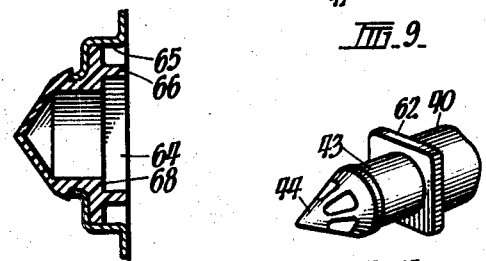
Figure 12:
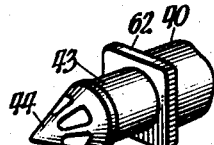
FIG. 12 is a perspective view of the end of the tap for engagement in the socket illustrated in FIGS. 10 and 11.
Figure 13:
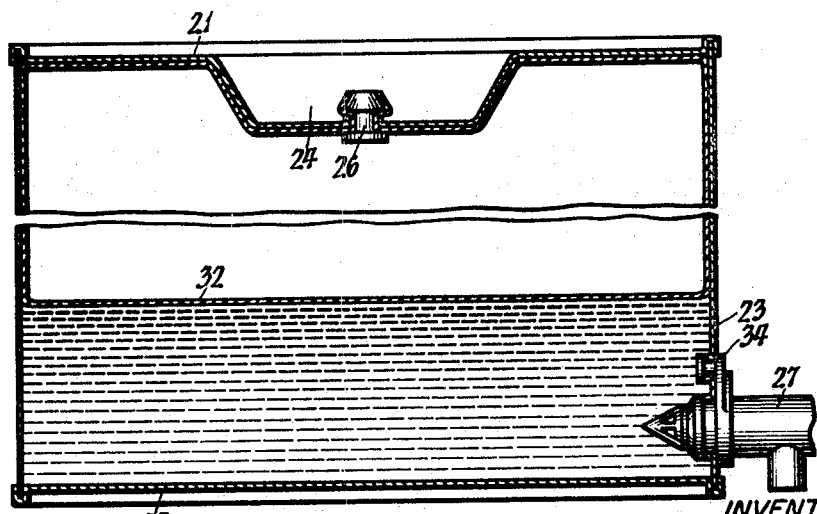
FIG. 13 is a vertical cross-section through a container, similar to FIG. 1 but showing the liquid contents of the container depleted and the air bag expanded to fill the space previously occupied by the liquid.

FIGS. 10, 11 and 12 illustrate a form of socket member 64 for engagement in a shaped recess 65 in the wall of the container, both the socket member 64 and recess 65 being of the same noncircular shape so that the socket member will be held against turning once it is fitted in position. Said socket member 64 has a flange 66 on its outer surface, providing a seating 68 to accommodate a flange 62 on the tap (the flange 62 and seating 68 being of the same noncircular shape so that the tap will be held against angular movement once it has been engaged in the socket.

In another modification the socket member is made with a noncircular (as square) neck portion to fit in a similarly shaped hole in the wall of the container, the noncircular neck portion being effective to hold the socket member against turning relative to the container. At the inner end of that neck is a bead of circular or other suitable shape and there is provided a ring member having an internal groove to engage with the inner end portion of the neck and grip about the bead so as to thereby clamp the socket member in position in the wall of the container. In the construction the neck of the socket member should be a tight fit in the opening in the wall. This construction is illustrated and described in my copending application filed concurrently herewith.

It is to be appreciated that the invention is not limited to containers as illustrated in the drawings. Thus, there will be a field of utility of the invention in large vats, for the storage of unfortified wines, in particular. The container may be made in the form of a barrel, as with a suitable stand for supporting the barrel in horizontal position, when the socket member may be located in one of the end walls. In such a construction it may be found convenient to have the air bag fastened to the circumferential wall. Also, other forms of tap may be used, and means other than the socket member 34 provided for supporting the tap in appropriate position. Thus, the appropriate wall of the container may be made to receive the tap as a fitting directly to that wall. However, that arrangement would call for the puncturing of the wall of the container before the tap is fitted and that may require a special tool.

It will also be appreciated that in some instances it may be desired to provide for a flow of some gas other than air to the interior of the flexible lining or bag. For the purposes of this specification the word "air" as used herein, and in the claims, is to be deemed to include such gases. Further, it may be desired to provide for the supply of gas under pressure to the interior of the air bag, so as to effect a pressure feed of the liquid from the container.

If desired the air vent may be constructed so that the passage of foreign matter into the interior of the flexible bag or lining 32 will be greatly restricted. Thus, the outer end of the plug 26 may be made with a relatively fine filter extending across the outer end of the passageway 31, or an inlet valve may be provided in the plug. In certain cases it may be desirable to attach the flexible bag to the relative wall of the container in other manner as by providing a tube connected to the air bag and adapted to be secured in an opening in the wall of the container, or by fastening a rim of the air bag to the rim of the circumferential wall of the container.

What I claim is:

1. A bulk container for liquids comprising a container, a collapsible bag attached to a wall of said container, air vent means arranged to permit the flow of air into said collapsible bag as liquid is discharged from said container, the collapsible bag being adapted to restrict contact of air with the liquid; a socket member disposed in one wall of said container, said socket member comprising a neck portion and a locating plug part which engage openings in said container wall, said socket member being adapted to receive a tap for dispensing the liquid contents of the container, said tap comprising a barrel portion and an outlet nozzle.

2. A bulk container for liquids as claimed in claim 1 wherein said socket member is nonrotatably mounted in said one wall and has means for holding said tap against rotation.

3. A bulk container for liquids as claimed in claim 2 wherein said socket member has a frangible diaphragm across its inner end.

4. A bulk container for liquids as claimed in claim 3 wherein said neck portion of said socket members fits tightly in the opening in said one wall and has a bead portion at its inner end with a ring member engaged tightly with said bead to hold said socket member against displacement from the container.

5. A bulk container for liquids as claimed in claim 4 wherein said air vent means comprises a plug member connected to the collapsible bag and to an opening in said wall of the container, said member having passageway means to permit the flow or air into said bag.

6. A bulk container for liquids as claimed in claim 5 wherein said passageway means is initially sealed against flow of air in such manner that the seal may be readily broken when it is desired to draw liquid from the container.

7. A bulk container for liquids as claimed in claim 6 wherein said member connecting the collapsible bag to said wall consists of a plug housed within the bag and having an outer part of such size that it is firmly gripped in an opening in the wall of the container when pressed into said opening.

8. A bulk container for liquids as claimed in claim 3 wherein a part of the material of said collapsible bag is stretched across the outer end of the plug to form the frangible diaphragm.

9. A bulk container for liquids as claimed in claim 3 wherein said socket member has engaged therewith means for indicating whether the containers have been tampered with, said means comprising slits having thin arms fitted therethrough with their ends spread outwardly across the external surface of the container.

10. A bulk container for liquids as claimed in claim 2 wherein said tap has at its inner end a probe of somewhat conical shape having a plurality of openings therethrough, a flange at an intermediate position in its length to engage nonrotatably in the socket, and a turn-cock to control the flow of liquid through the tap.

References Cited

UNITED STATES PATENTS

| | | | |
|---|---|---|---|
| 642,960 | 2/1900 | Clibborn | 222—386.5 |
| 821,875 | 5/1906 | Kneuper | 222—386.5 |
| 3,128,913 | 4/1964 | Specketer | 222—541 X |
| 3,272,405 | 9/1966 | Todd et al. | 222—541 X |

ROBERT B. REEVES, Primary Examiner

FREDERICK R. HANDREN, Assistant Examiner

U.S. Cl. X.R.

222—130, 153, 386.5, 541, 554